United States Patent
Niu et al.

(10) Patent No.: US 10,153,923 B2
(45) Date of Patent: Dec. 11, 2018

(54) SINGLE CARRIER EQUALIZER AND A RECEIVER SYSTEM COMPRISING THE SINGLE CARRIER EQUALIZER

(71) Applicant: AMLOGIC (SHANGHAI) CO., LTD., Shanghai (CN)

(72) Inventors: Jin Niu, Shanghai (CN); Xiaotong Liu, Shanghai (CN); Jinhong Zhang, Shanghai (CN); Chun Wang, Shanghai (CN)

(*) Notice: Subject to any disclaimer, the term of this patent is extended or adjusted under 35 U.S.C. 154(b) by 0 days.

(21) Appl. No.: 15/560,157

(22) PCT Filed: Apr. 18, 2017

(86) PCT No.: PCT/CN2017/080939
§ 371 (c)(1),
(2) Date: Sep. 21, 2017

(87) PCT Pub. No.: WO2017/215343
PCT Pub. Date: Dec. 21, 2017

(65) Prior Publication Data
US 2018/0191531 A1    Jul. 5, 2018

(30) Foreign Application Priority Data
Jun. 15, 2016 (CN) .......................... 2016 1 0423401

(51) Int. Cl.
*H04L 27/00* (2006.01)
*H04L 25/03* (2006.01)
*H04L 27/01* (2006.01)

(52) U.S. Cl.
CPC ........ *H04L 25/03159* (2013.01); *H04L 25/03* (2013.01); *H04L 25/03878* (2013.01); *H04L 27/01* (2013.01)

(58) Field of Classification Search
CPC .................... H04L 25/03159; H04L 25/03878
See application file for complete search history.

(56) References Cited

U.S. PATENT DOCUMENTS

| | | | | |
|---|---|---|---|---|
| 2010/0118993 A1* | 5/2010 | Galda | ................. | H04L 25/0236 375/260 |
| 2011/0007789 A1* | 1/2011 | Garmany | .............. | H04L 25/022 375/224 |
| 2011/0310952 A1* | 12/2011 | Wei | ................... | H04L 25/03146 375/233 |
| 2012/0093272 A1* | 4/2012 | Kimata | ................ | H04L 25/022 375/348 |

* cited by examiner

*Primary Examiner* — Dac Ha
(74) *Attorney, Agent, or Firm* — Adam C. Underwood

(57) ABSTRACT

The invention relates to the field of the equalizer, more specifically, to a single carrier equalizer and a receiver system comprises the single carrier equalizer. It is used to gradually improve the performance of the frequency domain equalizer by the way of iterations. The present invention uses an iterative updater to conduct a first iteration based on the frequency domain value of the input signal and the frequency domain value of the channel of the input signal, and transmits the iteration result to the inverse fast Fourier transformer. And the signal decision device is used to judge the value of the output of the inverse fast Fourier transformer, and the output signal of the signal decision device is transmitted to the fast Fourier transformer and the iterative updater respectively.

18 Claims, 1 Drawing Sheet

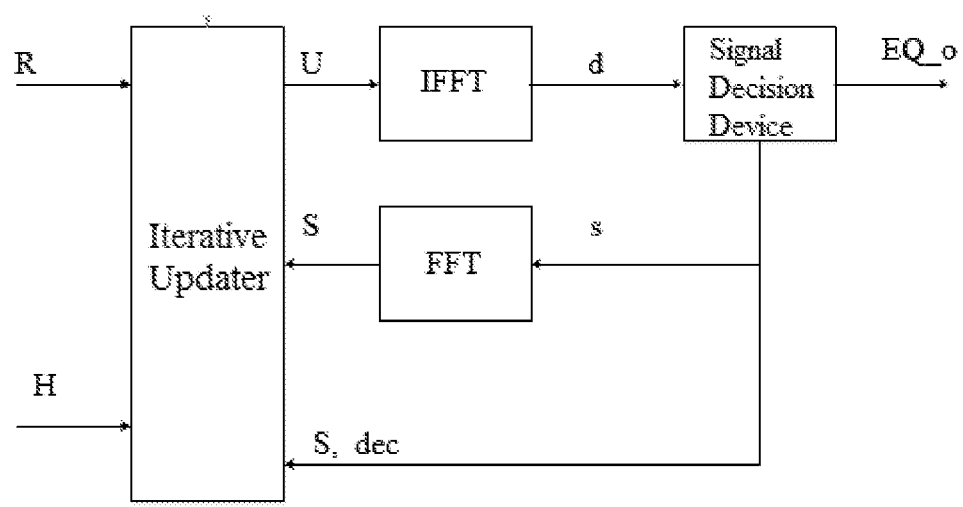

SINGLE CARRIER EQUALIZER AND A RECEIVER SYSTEM COMPRISING THE SINGLE CARRIER EQUALIZER

CROSS-REFERENCE TO RELATED APPLICATIONS

The present application claims priority to and the benefit of Chinese Patent Application No. CN 201610423401.7, filed on Jun. 15, 2016, the entire content of which is incorporated herein by reference.

BACKGROUND OF THE INVENTION

1. Field of the Invention

The invention relates to the field of equalizer, more specifically, to a single carrier equalizer and a receiver system comprising the single carrier equalizer.

2. Description of the Related Art

At present, with the rapid development of science and technology and social progress, people are increasingly demanding the speed and accuracy of data transmission, especially in the field of data reception/transmission using wireless signals, because of the better portability, people's expectations are often higher. However, in the prior art, due to more external disturbances during data transmission, distortion still occurs frequently in a wireless data sending/receiving system during data transmission, especially in the process of data transmission with limited bandwidth and multiple channels, data distortion is particularly prominent.

In order to effectively restore the distortion signal, the industry usually provides a time domain equalizer or frequency domain equalizer at the receiver. However, due to various technical limitations, all equalizer in prior art cannot meet the demands, the performance of the equalizer is poorer, especially in complex multipath data transmission, which results in a significant reduction in the performance of the entire receiver system. When there is narrowband interference in the frequency domain, the performance of the equalizer is greatly reduced. It is necessary to calculate each iteration factor, especially in the single carrier equalizer, because during the equalization, the interference energy of the narrowband interference region will affect the entire time domain decision value by Fourier transform, these are undesirable for those skilled in the art.

SUMMARY OF THE INVENTION

In view of the deficiencies of the prior art, the present invention provides a single carrier equalizer that can be applied to single-carrier mode for data transmission and a receiver system comprising the single carrier equalizer, the iterative frequency domain equalization is achieved by adding an iterative updater, that is, the invention is increasing the frequency domain equalization performance through the iterative, in order to enhance the anti-multipath and mobile performance of the equalizer, thereby enhancing the demodulation performance of entire receiver system, and, in equalization, improving the performance of single carrier iterative equalizer under narrowband interference and reducing the influence of narrowband interference.

The invention utilizes the following technical schemes, A single carrier equalizer, comprising:

an iterative updater, iterating input signal based on a frequency domain value of the input signal and a frequency domain value of a transmission channel of the input signal, and outputting a frequency domain value of the input signal after iteration; an iteration stop condition being stored in the iterative updater, the iterative updater determining whether a current number of iterations of the input signal satisfies the iteration stop condition before other actions when performing an iterative operation; if it is satisfied, the iterative operation is stopped; otherwise, it continues the iteration operation;

an inverse fast Fourier transformer, connected with the iterative updater, to convert frequency domain values of the iterated input signal into time domain values;

a fast Fourier transformer, connected with the iterative updater;

a signal decision device, respectively connected with the inverse fast Fourier transformer, the fast Fourier transformer and the iterative updater, to judge the input signal according to a time domain value of the received iterated input signal;

wherein, a decision signal output by the signal decision device and a time domain value of the decision signal are sent to the iterative updater, the fast Fourier transformer receives the decision signal to output a frequency domain value of the decision signal to the iterative updater.

The above single carrier equalizer, wherein, the iterative updater uses the formula (1) to iterate the input signal according to the frequency domain value of the input signal and the frequency domain value of the transmission channel of the input signal, and outputs the frequency domain value of the iterated input signal; The formula (1) is:

$$U(\text{iter},c)=C(\text{iter},c)*(R(c)-S(\text{iter}-1,c)*H(c)); \text{ and}$$

in the formula(1), $C(\text{iter},c)=\text{conj}(H(c))/((1-\text{rou}(\text{iter}-1))*\text{abs}(H(c))^2+M\_H/\text{Factor}(\text{iter}-1,c));$ wherein, U is the frequency domain value of the input signal after iteration, iter is the number of iterations, c is the frequency domain subcarrier number, C is an iteration update factor, R is the frequency domain value of the input signal, S is the frequency domain value of the decision signal, H is the frequency domain value of the channel response of the transmission channel of the input signal, conj stands for a conjugation, rou is an iterative confidence factor, abs stands for performing modulus, M_H stands for the channel average energy, Factor is a noise correction factor.

The above single carrier equalizer, wherein, when iter=1, in the formula (1), $\text{Factor}(\text{iter}-1,c)=\text{Pow\_Signal}(c)/\text{Pow\_Error}(c);$ wherein, Pow_Signal stands for signal energy, and Pow_Error strands for noise energy.

The above single carrier equalizer, wherein, in the formula (1), $\text{Pow\_Error}(c)=\text{abs}(\text{Error}(c))^2;$ Error stands for the error signal.

The above single carrier equalizer, wherein, in the formula (1), $\text{Error}(c)=R(c)-H(c)*S(\text{iter}-1,c).$ The above single carrier equalizer, wherein, in the formula (1), $\text{Pow\_Signal}(c)=\text{abs}(\text{Signal}(c))^2.$ The above single carrier equalizer, wherein, in the formula (1), $\text{Signal}(c)=R(c)$ or $\text{Signal}(c)=H(c)*S(\text{iter}-1,c).$ The above single carrier equalizer, wherein, in the formula (1), Error (c) is divided into p segments, and each segment contains k subcarriers, p and k are positive integers;

$$\text{Pow\_Error}(c)=\text{Mean}(\text{abs}(\text{Error}(c))^2), \text{ wherein,}$$
$$pk-1>c>(p-1)k \text{ and } c<pk-1.$$

The above single carrier equalizer, wherein, in the formula (1), Signal(c) is divided into p segments, and each segment contains k subcarriers, p and k are positive integers;

Pow_Signal($c$)=Mean(abs(Signal($c$))^2), wherein, $pk-1 \geq c \geq (p-1)k$ and $c<pk-1$.

The above single carrier equalizer, wherein, when iter>1, in the formula (1), Factor(iter-1,c)=Pow_Signal(iter-1, c)/Pow_Error(iter-1, c);

wherein, Pow_Error(iter-1,$c$)=Pow_Error(iter-2,$c$)*(1-alpha)+alpha*Pow_Error($c$);

Pow_Signal(iter-1,$c$)=Pow_Signal(iter-2,$c$)*(1-alpha)+alpha*Pow_Signal($c$);

wherein, alpha is an iteration forgetting factor.

The above single carrier equalizer, wherein, in the event that the factors of the i frame are calculated, Factor(i,iter-1,c)=Pow_Signal(i, iter-1, c)/Pow_Error(i, iter-1, c);

wherein, Pow_Error($i$,iter-1,$c$)=Pow_Error($i$-1,iter-1,$c$)*(1-beta)+Pow_Error($c$)*beta;

Pow_Signal($i$,iter-1,$c$)=Pow_Signal($i$-1,iter-1,$c$)*(1-beta)+Pow_Signal($c$)*beta;

beta is an inter frame forgetting factor.

The above single carrier equalizer, wherein, in the formula (1),

Factor(iter-1,$c$)=mean(abs($d$(iter-1,$n$))^2)/mean(abs(dec(iter-1,$n$)-$d$(iter-1,$n$))^2);

rou(iter-1)=abs(mean($d$(iter-1,$n$)*conj(dec(iter-1,$n$))))^2/mean(abs($d$(iter-1,$n$))^2)/mean(abs(dec(iter-1,$n$))^2)

$M\_H$=mean(abs($H$($c$))^2);

wherein, mean stands for averaging, d is a time domain value of the input signal after iteration, dec is a time domain value of the decision signal, and n is a sequence number in a signal time domain frame.

The above single carrier equalizer, wherein, the signal decision device uses a hard decision criterion to judge the input signal.

The above single carrier equalizer, wherein, the hard decision criterion is that point on constellation diagram which has minimum Euclidean distance to an input value is taken as a signal decision value.

The application also discloses a receiver system, including the aforementioned single carrier equalizer.

The beneficial effects of the present invention are as follows:

The invention increases the performance of the frequency domain equalization through the iterative. The present invention uses an iterative updater to conduct a first iteration based on the frequency domain value of the input signal and the frequency domain value of the channel of the input signal, and transmits the iteration result to the inverse fast Fourier transformer. And the signal decision device is used to judge the value of the output of the inverse fast Fourier transformer, and the output signal of the signal decision device is transmitted to the fast Fourier transformer and the iterative updater respectively, that is, the signal after the fast Fourier transform is also entered into the iterative updater, at this point the iterative updater can start the next iteration of the equalization operation and repeat it until the iteration stop condition is reached; And during equalization, it uses iterative factor calculator to improve the performance of single carrier iterative equalizer under narrowband interference, and reduces the influence of narrowband interference.

BRIEF DESCRIPTIONS OF THE DRAWINGS

The accompanying drawings, together with the specification, illustrate exemplary embodiments of the present disclosure, and, together with the description, serve to explain the principles of the present invention.

FIG. 1 is a schematic diagram of a single carrier equalizer in an embodiment of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

It should be noted that, in the absence of conflict, the following technical solutions, technical characteristics can be combined with each other.

The present invention will be described in further detail with reference to the accompanying drawings.

As shown in FIG. 1, the embodiment of the present invention relates to a single carrier equalizer which may include an iterative updater, an inverse fast Fourier transformer (IFFT), a fast Fourier transformer (FFT), and a signal decision device. The iterative updater can iterate the input signal based on the formula (1) and according to the frequency domain value (R) of the input signal and the frequency domain value (H) of the transmission channel of the input signal, and outputs the frequency domain value (U) of the input signal after iteration, and iteration stop condition is preconfigured in the iterative updater, so that the iterative updater can to determine whether the number of iterations of the input signal satisfies the iteration stop condition first during an iterative operation; if it is satisfied, the iterative operation is stopped; otherwise, the iterative operation is continued; And an inverse fast Fourier transformer (IFFT) is connected with the iterative updater to convert the frequency domain value (U) of the input signal which is after iteration to the time domain value (d); a fast Fourier transformer (FFT) is connected with the iterative updater; a signal decision device can be respectively connected with the inverse fast Fourier transformer (IFFT), the fast Fourier transformer (FFT) and the iterative updater, to judge the input signal according to the received time domain value (d) of the input signal which is after iteration; in a preferred embodiment of the present invention, the iterative updater iterates the input signal based on the formula (1) and according to the frequency domain value (R) of the input signal and the frequency domain value (H) of the transmission channel of the input signal, and outputs the frequency domain value (U) of the input signal after the iteration; the formula (1) is: $U(iter, c)=C(iter, c)*(R(c)-S(iter-1, c)*H(c))$; And in the formula (1), $C(iter, c)=conj(H(c))/((1-rou(iter-1))*abs(H(c))^2+M\_H/Factor(iter-1, c))$, wherein U is the frequency domain value of the input signal after iteration, iter is the number of iterations, c is the frequency domain subcarrier number, C is an iteration update factor, R is the frequency domain value of the input signal, S is the frequency domain value of the decision signal, H is the frequency domain value of the channel response of the transmission channel of the input signal, conj stands for conjugation, rou is an iterative confidence factor, abs stands for performing modulus, M_H stands for channel average energy, Factor is a noise correction factor. It is worth mentioning that, in the event of the interference of the carrier, the R (c) needs to be set as zero.

In a preferred embodiment of the present invention, when iter=1, in the formula (1), $Factor(iter-1,c)=Pow\_Signal(c)/Pow\_Error(c)$; Pow_Signal stands for signal energy, and Pow_Error stands for noise energy.

In a preferred embodiment of the present invention, in the formula (1), $Pow\_Error(c)=abs(Error(c))^2$; Error stands for error signal.

On this basis, in the formula (1), $Error(c)=R(c)-H(c)*S(iter-1,c)-H(c)*S(iter-1,c)$.

In a preferred embodiment of the present invention, in the formula (1), $Pow\_Error(c)=abs(Signal(c))^2$.

On this basis, in the formula (1), $Error(c)=R(c)$ or $Signal(c)=H(c)*S(iter-1,c)$.

In a preferred embodiment of the present invention, in the formula (1), Error(c) is divided into p segments, and each segment contains k subcarriers, p and k are positive integers, there are many possibilities for the choice of P and k, $Pow\_Error(c)=Mean(abs(Error(c))^2)$, wherein $pk-1>c>(p-1)k$ and $c<pk-1$.

In a preferred embodiment of the present invention, in the formula (1), Signal(c) is divided into p segments, and each segment contains k subcarriers, p and k are positive integers, $Pow\_Signal(c)=Mean(abs(Signal(c))^2)$, wherein $pk-1>c>(p-1)k$ and $c<pk-1$.

In a preferred embodiment of the present invention, Pow_Error and Pow_Signal of iterations corresponding to different iterations number may also be averaged, when iter>1, in the formula (1), $Factor(iter-1,c)=Pow\_Signal(iter-1, c)/Pow\_Error(iter-1, c)$; and $Pow\_Error(iter-1, c)=Pow\_Error(iter-2, c)*(1-alpha)+alpha*Pow\_Error(c)$; $Pow\_Signal(iter-1, c)=Pow\_Signal(iter-2, c)*(1-alpha)+alpha*Pow\_Signal(c)$; and alpha is the iteration forgetting factor.

In a preferred embodiment of the present invention, there is also an averaging method based on the above calculations between different frames; in the event that the factor of the i frame is calculated, $Factor(i,iter-1,c)=Pow\_Signal(i, iter-1, c)/Pow\_Error(i, iter-1, c)$; Thereinto, $Pow\_Error(i, iter-1, c)=Pow\_Error(i-1, iter-1, c)*(1-beta)+Pow\_Error(c)*beta$; $Pow\_Signal(i, iter-1, c)=Pow\_Signal(i-1, iter-1, c)*(1-beta)+Pow\_Signal(c)*beta$; beta is an inter frame forgetting factor.

In a preferred embodiment of the present invention, in the formula (1), $Factor(iter-1,c)=mean(abs(d(iter-1,n))^2)/mean(abs(dec(iter-1,n)-d(iter-1,n))^2)$; $rou(iter-1)=abs(mean(d(iter-1,n)*conj(dec(iter-1,n))))^2/mean(abs(d(iter-1,n))^2)/mean(abs(dec(iter-1,n))^2)$ $M\_H=mean(abs(H(c))^2)$;

where mean stands for averaging, d is the time domain value of the input signal after the iteration, dec is the time domain value of the decision signal, and n is the sequence number in the signal time domain frame.

In a preferred embodiment of the present invention, the signal decision device uses a hard decision criterion to judge the input signal.

In a preferred embodiment of the present invention, the hard decision criterion is that the point on constellation diagram which has minimum Euclidean distance to the input value is taken as the signal decision value.

Furthermore, the decision signal (s) output from the signal decision and the time domain value (dec) of the decision signal are sent to the iterative updater, the fast Fourier transformer receives the decision signal to output a frequency domain value (S) of the decision signal to the iterative updater; the frequency domain of the input signal and a frequency domain value, matched with the input signal, or in another word, of the channel transmitting the input signal, are input to the iterative updater for the first iteration. After the first iteration, the signal is transmitted to the signal decision device by the inverse fast Fourier Transformer. And the signal output after judgment from the signal decision device is transmitted to the fast Fourier transformer and the iterative updater respectively. The fast Fourier transformer performs Fourier transform to the frequency domain value of the signal after judgment, and then transmits the result to the iterative updater. At this point, the iterative updater can start the next iteration of the equalization operation and repeat it until the iteration stop condition is reached, so that the output signal can reach the design requirements.

In a preferred embodiment of the present invention, the signal decision device can be implemented in a variety of ways, for example, by judging the input signal using a hard decision criterion, for example, the point on constellation diagram which has minimum Euclidean distance to the input value is taken as the signal decision value. However, Fast Fourier Transformer (FFT) and Inverse Fast Fourier Transformer (IFFT) can use the standard calculation module.

In addition, an embodiment of the present application also provides a receiver system, comprising any single carrier equalizer as discussed above, also comprising an analog-todigital converter, synchronous restorer, serial parallel converter, controller and other components, which be set based on the actual demands. Since it is possible to combine the existing receiver system and the single carrier equalizer of the present application to receive signals, detailed illustration is omitted.

In summary, the single carrier equalizer in the embodiment of the present application and the receiver system comprising the single carrier equalizer are used to gradually improve the performance of the frequency domain equalizer by the way of iterations. The present invention uses an iterative updater to conduct a first iteration based on the frequency domain value of the input signal and the frequency domain value of the channel of the input signal, and transmits the iteration result to the inverse fast Fourier transformer. And the signal decision device is used to judge the value of the output of the inverse fast Fourier transformer, and the output signal of the signal decision device is transmitted to the fast Fourier transformer and the iterative updater respectively, that is, the signal after the fast Fourier transform is also entered into the iterative updater, at this point the iterative updater can start the next iteration of the equalization operation and repeat it until the iteration stop condition is reached; And during equalization, it uses iterative factor calculator to improve the performance of single carrier iterative equalizer under narrowband interference, and reduces the influence of narrowband interference. Further, it enhances the anti-multipath and mobile performance of the equalizer, and enhances the demodulation performance of entire receiver system.

The embodiments described above are only the preferred embodiments of the present invention and these are not intended to thereby limit the embodiments and the scope of protection of the present invention. For the technical personnel in the field, should be aware of where the use of the invention instructions and diagrams content made by equivalent replacement and obviously change of the resulting scheme, shall be included in the scope of the present invention.

We claim:

1. A single carrier equalizer, comprising:
an iterative updater, iterating input signal based on a frequency domain value of the input signal and a frequency domain value of a transmission channel of the input signal, and outputting a frequency domain value of the input signal after iteration; an iteration stop condition being stored in the iterative updater, the iterative updater determining whether a current number of iterations of the input signal satisfies the iteration stop condition before other actions when performing an iterative operation; if it is satisfied, the iterative operation is stopped; otherwise, it continues the iteration operation;
an inverse fast Fourier transformer, connected with the iterative updater, to convert frequency domain values of the iterated input signal into time domain values;
a fast Fourier transformer, connected with the iterative updater;
a signal decision device, respectively connected with the inverse fast Fourier transformer, the fast Fourier transformer and the iterative updater, to judge the input signal according to a time domain value of the received iterated input signal;
wherein, a decision signal output by the signal decision device and a time domain value of the decision signal are sent to the iterative updater, the fast Fourier transformer receives the decision signal to output a frequency domain value of the decision signal to the iterative updater;
the iterative updater uses the formula (1) to iterate the input signal according to the frequency domain value of the input signal and the frequency domain value of the transmission channel of the input signal, and outputs the frequency domain value of the iterated input signal; The formula (1) is:

$$U(iter,c)=C(iter,c)*(R(c)-S(iter-1,c)*H(c)); \text{ and}$$

in the formula (1), $C(iter, c)=conj(H(c))/((1-rou(iter-1))*abs(H(c))^2+M\_H/Factor(iter-1,c))$;
wherein, U is the frequency domain value of the input signal after iteration, iter is the number of iterations, iter is a natural number, c is the frequency domain subcarrier number, C is an iteration update factor, R is the frequency domain value of the input signal, S is the frequency domain value of the decision signal, H is the frequency domain value of the channel response of the transmission channel of the input signal, conj stands for a conjugation, rou is an iterative confidence factor, abs stands for performing modulus, M_H stands for channel average energy, Factor is a noise correction factor.

2. The single carrier equalizer according to claim 1, wherein, when iter=1, in the formula (1), Factor(iter−1,c)=Pow_Signal(c)/Pow_Error(c);
wherein, Pow_Signal stands for signal energy, and Pow_Error strands for noise energy.

3. The single carrier equalizer according to claim 2, wherein, in the formula (1), Pow_Error(c)=abs(Error(c))^2; Error stands for the error signal.

4. The single carrier equalizer according to claim 3, wherein, in the formula (1), Error(c)=R(c)−H(c)*S(iter−1, c).

5. The single carrier equalizer according to claim 4, wherein, in the formula (1), Pow_Signal(c)= abs(Signal(c))^2.

6. The single carrier equalizer according to claim 5, wherein, in the formula (1), Signal(c)=R(c) or Signal(c)=H(c)*S(iter−1,c).

7. The single carrier equalizer according to claim 2, wherein, in the formula (1), Error (c) is divided into p segments, and each segment contains k subcarriers, p and k are positive integers;

$$Pow\_Error(c)=Mean(abs(Error(c))^2), \text{ wherein,}$$
$$pk-1>c>(p-1)k \text{ and } c<pk-1.$$

8. The single carrier equalizer according to claim 2, wherein, in the formula (1), Signal(c) is divided into p segments, and each segment contains k subcarriers, p and k are positive integers;

$$Pow\_Signal(c)=Mean(abs(Signal(c))^2), \text{ wherein,}$$
$$pk-1>c>(p-1)k \text{ and } c<pk-1.$$

9. The single carrier equalizer according to claim 1, wherein, when iter>1, in the formula (1), Factor(iter−1,c)=Pow_Signal(iter−1, c)/Pow_Error(iter−1, c);

wherein, Pow_Error(iter−1,c)=Pow_Error(iter−2,c)*(1−alpha)+alpha*Pow_Error(c);

Pow_Signal(iter−1,c)=Pow_Signal(iter−2,c)*(1−alpha)+alpha*Pow_Signal(c);

wherein, alpha is an iteration forgetting factor.

10. The single carrier equalizer according to claim 1, wherein, in the event that the factors of the i frame are calculated, Factor(i,iter−1,c)=Pow_Signal(i, iter−1, c)/Pow_Error(i, iter−1, c);

wherein, Pow_Error($i$,iter−1,$c$)=Pow_Error($i$−1,iter−1,$c$)*(1−beta)+Pow_Error($c$)*beta;

Pow_Signal($i$,iter−1,$c$)=Pow_Signal($i$−1,iter−1,$c$)*(1−beta)+Pow_Signal($c$)*beta;

beta is an inter frame forgetting factor.

11. The single carrier equalizer according to claim 1, wherein, in the formula (1), Factor(iter−1,$c$)=mean(abs($d$(iter−1,$n$))^2)/mean(abs(dec(iter−1,$n$)−$d$(iter−1,$n$))^2);

rou(iter−1)=abs(mean($d$(iter−1,$n$)*conj(dec(iter−1,$n$))))^2/mean(abs($d$(iter−1,$n$))^2)/mean(abs(dec(iter−1,$n$))^2)

M_H=mean(abs($H$($c$))^2);

wherein, mean stands for averaging, d is a time domain value of the input signal after iteration, dec is a time domain value of the decision signal, and n is a sequence number in a signal time domain frame.

12. The single carrier equalizer according to claim 1, wherein, the signal decision device uses a hard decision criterion to judge the input signal.

13. The single carrier equalizer according to claim 12, wherein, the hard decision criterion is that point on constellation diagram which has minimum Euclidean distance to an input value is taken as a signal decision value.

14. A receiver system, wherein, comprising a single carrier equalizer, the single carrier equalizer comprising:

an iterative updater, iterating input signal based on a frequency domain value of the input signal and a frequency domain value of a transmission channel of the input signal, and outputting a frequency domain value of the input signal after iteration; an iteration stop condition being stored in the iterative updater, the iterative updater determining whether a current number of iterations of the input signal satisfies the iteration stop condition before other actions when performing an iterative operation; if it is satisfied, the iterative operation is stopped; otherwise, it continues the iteration operation;

an inverse fast Fourier transformer, connected with the iterative updater, to convert frequency domain values of the iterated input signal into time domain values;

a fast Fourier transformer, connected with the iterative updater;

a signal decision device, respectively connected with the inverse fast Fourier transformer, the fast Fourier transformer and the iterative updater, to judge the input signal according to a time domain value of the received iterated input signal;

wherein, a decision signal output by the signal decision device and a time domain value of the decision signal are sent to the iterative updater, the fast Fourier transformer receives the decision signal to output a frequency domain value of the decision signal to the iterative updater:

the iterative updater uses the formula (1) to iterate the input signal according to the frequency domain value of the input signal and the frequency domain value of the transmission channel of the input signal, and outputs the frequency domain value of the iterated input signal; The formula (1) is:

$U$(iter,$c$)=$C$(iter,$c$)*($R$($c$)−$S$(iter−1,$c$)*$H$($c$)); and in the formula (1), C (iter, c)=conj (H (c))/((1−rou (iter−1))*abs (H (c))^2+M_H/Factor(iter−1,c));

wherein, U is the frequency domain value of the input signal after iteration, iter is the number of iterations, iter is a natural number, c is the frequency domain subcarrier number, C is an iteration update factor, R is the frequency domain value of the input signal, S is the frequency domain value of the decision signal, H is the frequency domain value of the channel response of the transmission channel of the input signal, conj stands for a conjugation, rou is an iterative confidence factor, abs stands for performing modulus, M_H stands for channel average energy, Factor is a noise correction factor.

15. The receiver system according to claim 14, wherein, when iter=1, in the formula (1), Factor(iter−1,c)=Pow_Signal(c)/Pow_Error(c);

wherein, Pow_Signal stands for signal energy, and Pow_Error strands for noise energy.

16. The receiver system according to claim 15, wherein, in the formula (1), Pow_Error(c)=abs(Error(c))^2; Error stands for the error signal.

17. The receiver system according to claim 16, wherein, in the formula (1), Error(c)=R(c)−H(c)*S(iter−1,c).

18. The receiver system according to claim 17, wherein, in the formula (1), Pow_Signal(c)=abs(Signal(c))^2.

* * * * *